United States Patent
Arrasvuori et al.

(10) Patent No.: US 9,804,734 B2
(45) Date of Patent: Oct. 31, 2017

(54) METHOD, APPARATUS AND COMPUTER PROGRAM FOR DISPLAYING CONTENT

(75) Inventors: Juha Henrik Arrasvuori, Tampere (FI); Mikko Antero Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/404,102

(22) Filed: Feb. 24, 2012

(65) Prior Publication Data
US 2013/0222432 A1 Aug. 29, 2013

(51) Int. Cl.
| | |
|---|---|
| G06F 3/0484 | (2013.01) |
| G06F 3/0481 | (2013.01) |
| G06T 3/40 | (2006.01) |
| G06F 3/0487 | (2013.01) |
| G06F 1/16 | (2006.01) |
| H04M 1/02 | (2006.01) |

(52) U.S. Cl.
CPC ........ *G06F 3/04815* (2013.01); *G06F 1/1652* (2013.01); *G06F 3/0487* (2013.01); *G06F 3/04845* (2013.01); *H04M 1/0268* (2013.01); *G06F 2203/04805* (2013.01); *G06F 2203/04806* (2013.01)

(58) Field of Classification Search
CPC ... G06T 19/00; G06F 3/04842; G06F 3/0484; G06F 3/04845; G06F 3/04815; G06F 3/0485; G06F 17/30241; H04L 41/22
USPC ....... 345/156, 619, 204, 173, 684, 158, 184, 345/169, 649–682; 455/566; 348/51, 348/837; 715/864, 771
See application file for complete search history.

(56) References Cited

U.S. PATENT DOCUMENTS

| | | | |
|---|---|---|---|
| 8,543,166 B2* | 9/2013 | Choi ..................... | G06F 1/1601 345/156 |
| 8,638,311 B2* | 1/2014 | Kang ..................... | G06F 3/041 345/173 |
| 8,922,531 B2* | 12/2014 | Lee ............................... | 345/661 |
| 9,489,913 B2* | 11/2016 | Kwak ................... | G06F 3/0487 |

(Continued)

FOREIGN PATENT DOCUMENTS

| | | |
|---|---|---|
| EP | 0 965 970 A1 | 12/1999 |
| EP | 2 151 978 A1 | 2/2010 |

(Continued)

OTHER PUBLICATIONS

Herkenrath, Gero et al., "TWEND: twisting and bending as new interaction gesture in mobile device", CHI EA 2008 Extended Abstracts on Human Factors in Computing Systems, pp. 3819-3824, Apr. 5-10, 2008.*
Lahey, Byron et al., "PaperPhone: Understanding the Use of Bend Gestures in Mobile Devices with Flexible Electronic Paper Displays", CHI 2011, Session: Flexible Grips & Gestures, pp. 1303-1312, May 7-12, 2011.*

(Continued)

*Primary Examiner* — Chante Harrison
(74) *Attorney, Agent, or Firm* — Alston & Bird LLP

(57) ABSTRACT

A method, apparatus and computer program comprises: displaying, first content on a display; detecting a user input wherein the user input comprises deforming at least a portion of a housing of an apparatus; and in response to detecting the user input, performing a geometric transformation on the content such that after the geometric transformation second content, different to the first content is displayed on the display; wherein the location of the deforming within the housing of the apparatus determines a location within the content for performing the geometric transformation.

17 Claims, 9 Drawing Sheets

(56) References Cited

U.S. PATENT DOCUMENTS

| | | | |
|---|---|---|---|
| 2003/0098857 A1* | 5/2003 | Gettemy et al. | 345/173 |
| 2004/0008191 A1* | 1/2004 | Poupyrev et al. | 345/184 |
| 2004/0212588 A1 | 10/2004 | Moriyama | |
| 2005/0140646 A1* | 6/2005 | Nozawa | 345/156 |
| 2006/0238494 A1* | 10/2006 | Narayanaswami et al. | 345/156 |
| 2006/0274036 A1* | 12/2006 | Hioki et al. | 345/156 |
| 2007/0009222 A1 | 1/2007 | Koo et al. | |
| 2007/0132726 A1* | 6/2007 | Moriyama | 345/156 |
| 2007/0205997 A1* | 9/2007 | Lieshout et al. | 345/204 |
| 2007/0247422 A1 | 10/2007 | Vertegaal et al. | |
| 2008/0204420 A1 | 8/2008 | Dunnigan et al. | |
| 2009/0085866 A1* | 4/2009 | Sugahara | G03G 15/5016 345/156 |
| 2010/0011291 A1* | 1/2010 | Nurmi | 715/702 |
| 2010/0056223 A1* | 3/2010 | Choi et al. | 455/566 |
| 2010/0097338 A1* | 4/2010 | Miyashita et al. | 345/173 |
| 2010/0117975 A1* | 5/2010 | Cho | 345/173 |
| 2010/0128112 A1* | 5/2010 | Marti et al. | 348/51 |
| 2010/0141605 A1 | 6/2010 | Kang et al. | |
| 2010/0164888 A1* | 7/2010 | Okumura et al. | 345/173 |
| 2011/0009169 A1* | 1/2011 | Kim | G06F 1/1624 455/566 |
| 2011/0227822 A1* | 9/2011 | Shai | 345/156 |
| 2012/0115422 A1* | 5/2012 | Tziortzis | G06F 3/01 345/660 |
| 2012/0235893 A1* | 9/2012 | Phillips et al. | 345/156 |
| 2012/0268665 A1* | 10/2012 | Yetukuri et al. | 348/837 |
| 2013/0050269 A1 | 2/2013 | Arrasvuori | |
| 2013/0093660 A1* | 4/2013 | Hirsch et al. | 345/156 |
| 2013/0162534 A1* | 6/2013 | Chen et al. | 345/158 |
| 2013/0201093 A1* | 8/2013 | Kim et al. | 345/156 |
| 2014/0002402 A1* | 1/2014 | Kang et al. | 345/173 |
| 2014/0078047 A1* | 3/2014 | Seo | G06F 3/0487 345/156 |
| 2014/0310636 A1* | 10/2014 | Arrasvuori | G06F 3/01 715/771 |

FOREIGN PATENT DOCUMENTS

| | | |
|---|---|---|
| KR | 2011-0080573 A | 7/2011 |
| WO | WO 2010/004080 A1 | 1/2010 |
| WO | WO 2010/038157 A2 | 4/2010 |
| WO | WO 2011/005318 A2 | 1/2011 |
| WO | WO-2013/068791 A1 | 5/2013 |

OTHER PUBLICATIONS

Nokia Kinetic Device Offers a New Twist on Smartphone Interaction (hands-on Video) Publication Date: Oct. 27, 2011, [online][retrieved Dec. 30, 2011]. Retrieved from the Internet: <URL: http://www.theverge.com/2011/10/27/2518958/nokia-kinetic-device-offers-a-new-twist-on-smartphone-interaction> 12 pages.
Office Action for U.S. Appl. No. 13/404,098; dated Oct. 10, 2013.
Office Action from U.S. Appl. No. 13/404,098, dated Sep. 17, 2014.
International Search Report and Written Opinion for Application No. PCT/FI2013/050181 dated Nov. 8, 2013.
Lee, S. et al., *How Users Manipulate Deformable Displays as Input Devices*, CHI 2010: Devising Input (Apr. 10-15, 2010) 1647-1656.
Schwesig, C. et al., *Gummi: A Bendable Computer*, CHI 2004, vol. 6, No. 1. (Apr. 24-29, 2004), 263-270.
Adistarone: *3D Building Features on Goggle Maps Mobile App With 2 Fingers Tilt, Rotate, Zoom*, Youtube [online] [retrieved Nov. 1, 2013]. Retrieved from the Internet: <URL: https://www.youtube.com/watch?v=1qkKK1Xt8W0>. (Jul. 21, 2011) 1 page.
Office Action for U.S. Appl. No. 13/404,098; dated Mar. 4, 2014.
Office Action for corresponding Chinese Application No. 201380019560.5 dated Apr. 5, 2016.
Office Action for European Application No. 13 718 892.6 dated Jan. 26, 2016.
Office Action for U.S. Appl. No. 13/404,098, dated Mar. 26, 2015.
Office Action from corresponding Korean Patent Application No. 2014-7026597, dated Sep. 17, 2015.
Office Action from corresponding Korean Patent Application No. 2014-7026597 dated Aug. 23, 2016.
Office Action from corresponding European Patent Application No. 13709957.8 dated Aug. 3, 2016.
Examiner's Answer for U.S. Appl. No. 13/404,098 dated Jun. 24, 2016.
Office Action from corresponding Chinese Patent Application No. 201380019560.5 dated Dec. 16, 2016.
Office Action for Chinese Application No. 2013800195605 dated May 10, 2017.
Patent Board Decision for U.S. Appl. No. 13/404,098 dated May 2, 2017.
Notice of Allowance for U.S. Appl. No. 13/404,098 dated May 23, 2017.
International Search Report and Written Opinion for Application No. PCT/IB2013/051419 dated Jul. 5, 2013.

\* cited by examiner

METHOD, APPARATUS AND COMPUTER PROGRAM FOR DISPLAYING CONTENT

TECHNOLOGICAL FIELD

Embodiments of the present invention relate to a method, apparatus and computer program for displaying content. In particular, they relate to a method, apparatus and computer program for displaying content which enables a user to control which content displayed.

BACKGROUND

Apparatus which display content such as images or maps are known. It is useful to provide a simple and intuitive way of enabling a user of such apparatus to control the apparatus to enable different content to be displayed.

BRIEF SUMMARY

According to various, but not necessarily all, embodiments of the disclosure there is provided a method comprising: displaying, first content on a display; detecting a user input wherein the user input comprises deforming at least a portion of a housing of an apparatus; and in response to detecting the user input, performing a geometric transformation on the content such that after the geometric transformation second content, different to the first content is displayed on the display; wherein the location of the deforming within the housing of the apparatus determines a location within the content for performing the geometric transformation.

In some embodiments the geometric transformation may comprise changing the scale of a first portion of the first content such that after the geometric transformation has been performed the first portion of the first content is displayed at a first scale and a second portion of the first content is displayed at a second scale where the second scale is different to the first scale.

In some embodiments the change in scale of the first portion of the first content may comprise reducing the scale of the first portion of the first content so that the second content can be displayed on the display.

In some embodiments wherein the second content may be displayed at the second scale.

In some embodiments the location of the deforming within the housing of the apparatus may determine the location of the first portion of the first content within the content.

In some embodiments the first portion of the first content may comprise content which is displayed in an area of the display which is deformed when the user input is made.

In some embodiments the method may further comprise detecting a further user input and in response to detecting the further user input performing a further geometric transformation so that the second content is removed from the display. The further user input may comprise deforming the same portion of the housing of the apparatus. The deforming of the further user input may be performed in a direction substantially opposite to the deforming of the user input.

In some embodiments the deforming may comprise bending at least a portion of the housing of the apparatus.

In some embodiments the content may comprise a map.

In some embodiments the content may comprise at least one graphical representation of a three dimensional object wherein the graphical representations provide the perception of the three dimensions of the object.

In some embodiments the geometrical transformation may comprise changing the scale of at least one of the perceived dimensions of the at least one graphical representation of a three dimensional object.

In some embodiments the geometrical transformation may comprise rotating the content about an axis wherein the location of the deforming of the housing of the apparatus determines the location of the axis of rotation within the content.

According to various, but not necessarily all, embodiments of the disclosure there is provided an apparatus comprising: at least one processor; and at least one memory including computer program code; wherein the at least one memory and the computer program code are configured to, with the at least one processor, enable the apparatus to: display, first content on a display; detect a user input wherein the user input comprises deforming at least a portion of a housing of the apparatus; and in response to detecting the user input, perform a geometric transformation on the content such that after the geometric transformation second content, different to the first content is displayed on the display; wherein the location of the deforming within the housing of the apparatus determines a location within the content for performing the geometric transformation.

In some embodiments the geometric transformation may comprise changing the scale of a first portion of the first content such that after the geometric transformation has been performed the first portion of the first content is displayed at a first scale and a second portion of the first content is displayed at a second scale where the second scale is different to the first scale.

In some embodiments the change in scale of the first portion of the first content may comprise reducing the scale of the first portion of the first content so that the second content can be displayed on the display.

In some embodiments the second content may be displayed at the second scale.

In some embodiments the location of the deforming within the housing of the apparatus may determine the location of the first portion of the first content within the content.

In some embodiments the first portion of the first content may comprise content which is displayed in an area of the display which is deformed when the user input is made.

In some embodiments the at least one memory and the computer program code may be further configured to, with the at least one processor, enable the apparatus to detect a further user input and in response to detecting the further user input perform a further geometric transformation so that the second content is removed from the display. The further user input may comprise deforming the same portion of the housing of the apparatus. The deforming of the further user input may be performed in a direction substantially opposite to the deforming of the user input.

In some embodiments the deforming may comprise bending at least a portion of the housing of the apparatus.

In some embodiments the content may comprise a map.

In some embodiments the content may comprise at least one graphical representation of a three dimensional object wherein the graphical representations provide the perception of the three dimensions of the object.

In some embodiments the geometrical transformation may comprise changing the scale of at least one of the perceived dimensions of the at least one graphical representation of a three dimensional object.

In some embodiments the geometrical transformation may comprise rotating the content about an axis wherein the location of the deforming of the housing of the apparatus determines the location of the axis of rotation within the content.

According to various, but not necessarily all, embodiments of the disclosure there is provided a computer program comprising computer program instructions that, when executed by at least one processor, cause an apparatus at least to perform: displaying, first content on a display; detecting a user input wherein the user input comprises deforming at least a portion of a housing of an apparatus; and in response to detecting the user input, performing a geometric transformation on the content such that after the geometric transformation second content, different to the first content is displayed on the display; wherein the location of the deforming within the housing of the apparatus determines a location within the content for performing the geometric transformation.

In some embodiments there may also be provided a computer program comprising program instructions for causing a computer to perform the method described above.

In some embodiments there may also be provided a physical entity embodying the computer program described above.

In some embodiments there may also be provided an electromagnetic carrier signal carrying the computer program described above.

The apparatus may be for wireless communication

BRIEF DESCRIPTION

For a better understanding of various examples of embodiments of the present invention reference will now be made by way of example only to the accompanying drawings in which:

FIG. 1 schematically illustrates an apparatus according to examplary embodiments of the disclosure;

FIG. 2 schematically illustrates another apparatus according to examplary embodiments of the disclosure;

DETAILED DESCRIPTION

The Figures illustrate a method, apparatus 1 and computer program 9 where the method comprises: displaying, first content on a display 15; detecting a user input wherein the user input comprises deforming at least a portion of a housing 25 of an apparatus 1; and in response to detecting the user input, performing a geometric transformation on the content such that after the geometric transformation second content, different to the first content is displayed on the display 15; wherein the location of the deforming within the housing 25 of the apparatus 1 determines a location within the content for performing the geometric transformation.

Figure 1:
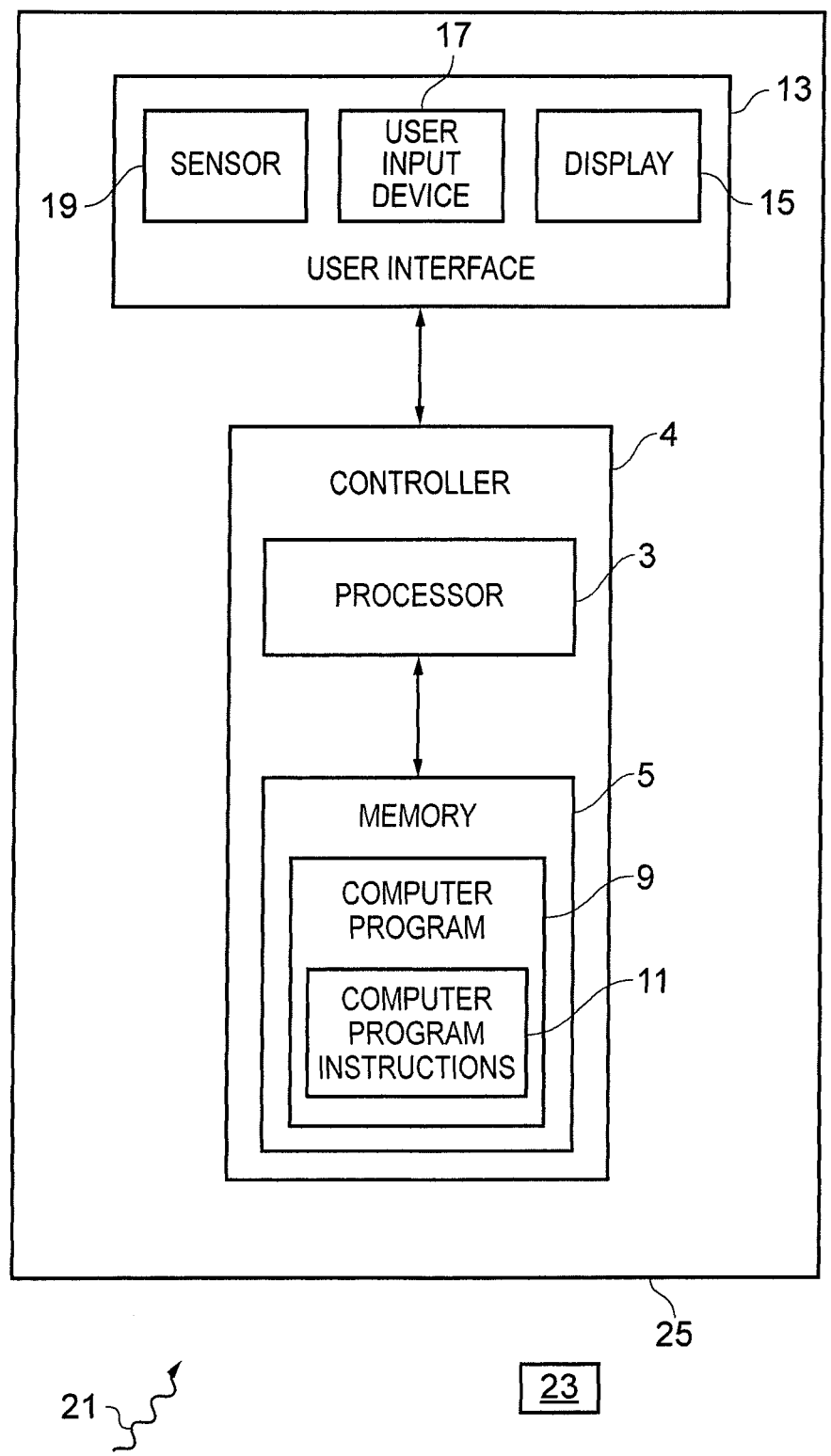

FIG. 1 schematically illustrates an apparatus 1 according to an examplary embodiment of the disclosure. The apparatus 1 may be an electronic apparatus. The apparatus 1 may be, for example, a mobile cellular telephone, navigation apparatus, a personal computer, a camera, a gaming device, a personal digital assistant, an electronic book reader, a personal music player, a tablet computer or any other similar apparatus. The apparatus 1 may be a handheld apparatus 1 which can be carried in a user's hand, handbag or pocket of their clothing for example.

Features referred to in the following description are illustrated in FIG. 1. However, it should be appreciated that the apparatus 1 may comprise additional features that are not illustrated. For example, in embodiments of the disclosure where the apparatus 1 is a mobile cellular telephone or other communications device, the apparatus 1 may also comprise one or more transmitters and receivers configured to enable wireless communication or any other type of communication.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15, a user input device 17 and at least one sensor 19. The at least one sensor 19 may be configured to detect physical deformation of the housing 25 of the apparatus 1.

The apparatus 1 illustrated in FIG. 1 also comprises a housing 25. The housing 25 provides an external casing for the apparatus 1. The components of the apparatus 1, which are illustrated schematically in FIG. 1 and FIG. 2, may be contained within the housing 25. Some of the components of the apparatus 1, such as the display 15 and the user input device 17 may be provided on the surface of the housing 25. The housing 25 may provide protection for the components of the apparatus 1. For example, the housing 25 may protect the components of the apparatus 1 from atmospheric conditions such as moisture or temperature variations. The housing 25 may also be configured to protect the components of the apparatus 1 from mechanical impacts.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc.) to be executed by such processors 3.

The controller 4 may be configured to control the apparatus 1 to perform a plurality of different functions. For example, where the apparatus 1 comprises a navigation apparatus the controller 4 may be configured to control the apparatus 1 to retrieve and display navigation information such as maps. In such examplary embodiments the controller 4 may also be configured to control the apparatus 1 perform other functions such as obtaining or determining a route from a first location on a map to a second location on a map and provide the obtained information to the user of the apparatus 1.

The controller 4 may also be configured to enable the apparatus 1 to display, first content on a display 15; detect a user input wherein the user input comprises deforming at least a portion of a housing 25 of an apparatus 1; and in response to detecting the user input, perform a geometric transformation on the content such that after the geometric transformation second content, different to the first content is displayed on the display 15; wherein the location of the deforming within the housing 25 of the apparatus 1 determines a location within the content for performing the geometric transformation.

The at least one processor 3 may be configured to receive input commands from the user interface 13 and also to provide output commands to the user interface 13. The at least one processor 3 may also be configured to write to and read from the at least one memory 5. The outputs of the user interface 13 may be provided as inputs to the controller 4.

The at least one memory 5 may be configured to store a computer program 9 comprising computer program instructions 11 that control the operation of the apparatus 1 when loaded into the at least one processor 3. The computer program instructions 11 may provide the logic and routines that enable the apparatus 1 to perform the methods illustrated in FIG. 3 and described below. The at least one processor 3 by reading the at least one memory 5 may be able to load and execute the computer program 9.

The computer program instructions 11 may provide computer readable program means configured to control the apparatus 1. The program instructions 11 may provide, when loaded into the controller 4; means for displaying, first content on a display 15; means for detecting a user input wherein the user input comprises deforming at least a portion of a housing 25 of an apparatus 1; and means for performing, in response to detecting the user input, a geometric transformation on the content such that after the geometric transformation second content, different to the first content is displayed on the display 15; wherein the location of the deforming within the housing 25 of the apparatus 1 determines a location within the content for performing the geometric transformation.

The computer program 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component in FIG. 1 it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the examplary embodiment illustrated in FIG. 1 the user interface 13 comprises a user input device 17, a display 15 and at least one sensor 19.

The user input device 17 may comprise any means which enables a user of the apparatus 1 to input information into the apparatus 1. The information may be used to control the apparatus 1. The information may be stored in the one or more memories 5 of the apparatus 1. The user input device 17 may comprise a touch sensitive display, a keypad, a joystick, voice recognition input, gaze tracking input device, hovering input device or navigation key or a combination of different types of user input devices.

The display 15 may comprise any means which enables information to be displayed to a user of the apparatus 1. The information may correspond to information which has been input by the user via the user input device 17, information which is stored in the one or more memories 5 or information which has been received by apparatus 1 or any other suitable information.

The display 15 may be any suitable type of display. In some embodiments the display 15 may comprise a stereoscopic display or any other type of display which enables images to be displayed which provide the perception of three dimensions.

In some embodiments of the disclosure the display 15 may be mounted in the housing 25 of the apparatus 1 so that when the housing 25 is bent or otherwise deformed the display 15 is also deformed.

In some embodiments of the disclosure the user interface 13 may also comprise one or more sensors 19. The sensors 19 may be configured to detect deformations such as bending, twisting or any other of the housing 25 of the apparatus 1 which are caused by a user applying stress to the housing 25 of the apparatus 1. In some embodiments the sensors 19 may be configured to determine the location of the deformation within the housing 25 of the apparatus 1 and provide an output signal to the controller 4 indicative of the location of the deformation of the housing 25 of the apparatus 1. This then enables the controller 4 to control the apparatus 1 in dependence upon the location of the deformation within the housing 25 of the apparatus 1.

In some examplary embodiments the sensors 19 may be configured to detect different contortions and deformations and provide an output signal to the controller 4 which enables the controller 4 to determine between the different contortions and deformations. In some examplary embodiments the sensors 19 may also be configured to detect different magnitudes of contortions and deformations. The controller 4 may then control the apparatus 1 in dependence upon the detected deformation.

The sensors 19 may comprise any suitable means which may be configured to detect a deformation of the housing 25 of the apparatus 1. In some examplary embodiments the sensors 19 may comprise capacitive sensors, inductive sensors, light sensors, hall sensors or any other suitable sensor or combinations of sensors.

In some examplary embodiments of the disclosure the housing 25 of the apparatus 1 may comprise a flexible body portion which may be physically deformed by a user applying stress to the housing 25. The physical deformation may comprise bending, folding, twisting or stretching or other contortion of the housing 25 of the apparatus 1 or a portion of the housing 25 of the apparatus 1.

In some embodiments of the disclosure the whole of the housing 25 may be flexible so that a user may be able to deform any part of the housing 25 by applying the appropriate external forces and stress. In other embodiments of the disclosure the housing 25 may comprise a flexible portion and a rigid portion so that the user can only deform the flexible portion of the housing 25. The rigid portion of the housing 25 may provide additional protection for sensitive components of the apparatus 1 which may be damaged if deformed.

The flexible body portion of the housing 25 may comprise a resiliently deformable material that surrounds an inner protective core. The inner protective core may house the controller 4 and other components that may be damaged if bent or deformed. The resiliently deformable material may comprise, for example, a gel or fluid in a sealed sac and/or elastomeric material.

In some embodiments the apparatus 1 may comprise a plurality of hinged or jointed segments. The hinged or jointed segments may be configured to be moved with respect to each other to enable a portion of the apparatus 1 to be folded or bent. The apparatus 1 may be folded or bent in response to a force applied by the user of the apparatus 1.

Figure 2:
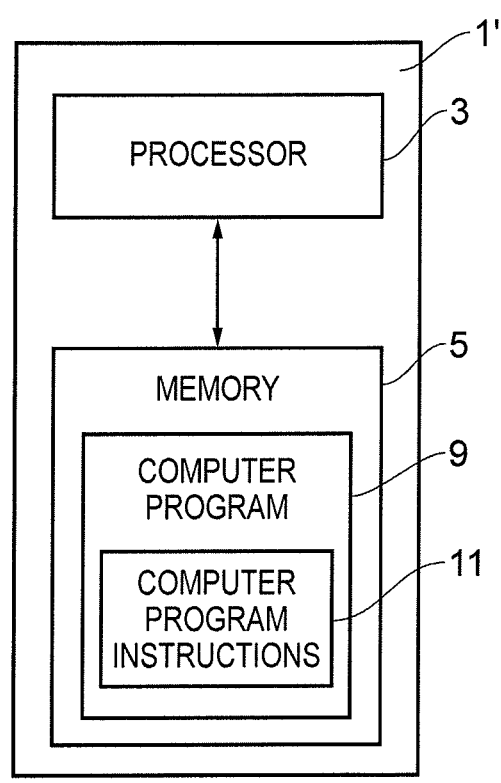

FIG. 2 illustrates an apparatus 1' according to another embodiment of the disclosure. The apparatus 1' illustrated in FIG. 3 may be a chip or a chip-set. The apparatus 1' comprises at least one processor 3 and at least one memory 5 as described above in relation to FIG. 1. The apparatus 1' may be contained within the housing 25.

Figure 3:
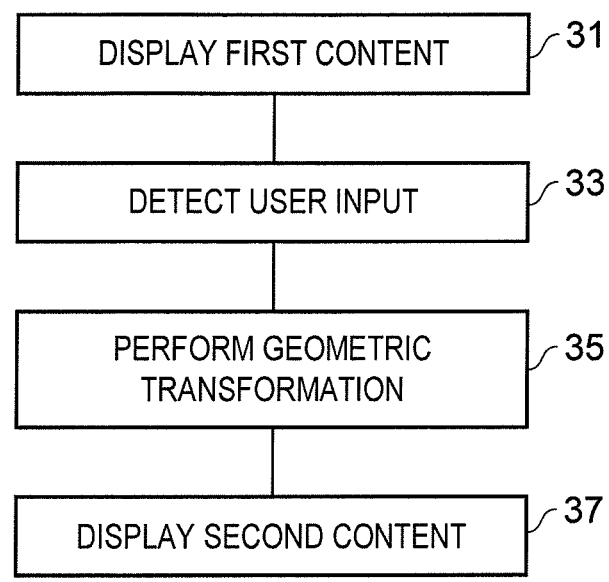
FIG. 3 is a block diagram which illustrates a method according to embodiments of the disclosure.

FIG. 3 illustrates a method according to examplary embodiments of the disclosure. The method may be implemented using apparatus 1 illustrated in FIGS. 1 and 2 and described above.

At block 31 first content may be displayed on a display 15.

The first content may comprise any suitable information which may be displayed on the display 15. For example the content may comprise images such as maps or photographs or graphical representations or any suitable images. In other embodiments the content may comprise text such as a webpage or a book or any suitable text. In some embodiments the content may comprise any combination of different types of content.

In some examplary embodiments the first content may comprise graphical representations of three dimensional objects. The graphical representations may provide the perception of the three dimensions of an object so that a user viewing the graphical representation would recognize that the object has three dimensions. In some examplary embodiments the dimensions may comprise depth, width and height. In a Cartesian coordinate system the three dimensions may correspond to an x, y and z axis where each axis is perpendicular to the other two axis.

The content which is displayed at block 31 may comprise a portion of the content which is available to be displayed. For example, in embodiments of the disclosure where the content comprises a map, the map may represent a geographical region and a map representing the whole of the region may be stored in the one or more memories 5. However, the apparatus 1 may be configured so that only a portion of the map might be displayed on the display 15 at any one time. The amount of the map which is displayed may depend on the size of the display 15 available and the resolution at which the map is viewed. A user may be able to use a user input device 13 to scroll through the map to view the different sections of the map which are not initially displayed on the display 15. When a user scrolls through the map the content which is added to the display 15 replaces content which was initially displayed on the display 15 and there is no change in the scale of the map displayed on the display 15.

At block 31 the content may be displayed at a first scale. At block 31 all of the content which is displayed on the display 15 may be displayed at the same scale so that there is uniform scaling of the first content. The user may be able to use the user input device 13 to change the scale of the content. This may cause all of the first content which is displayed on the display 15 to be rescaled uniformly.

At block 31 the content may be displayed as though it is viewed from a first orientation. The orientation may determine the view point from which it appears that the content is being viewed. In examplary embodiments the content may initially be displayed as though it is oriented in a plane which is parallel to the plane of the surface of the display 15.

At block 33 a user input is detected. In examplary embodiments of the disclosure the user input comprises deforming at least a portion of the housing 25 of the apparatus 1. The deformation may comprise any change in size or shape of the housing 25 of the apparatus 1 in response to an external force applied by the user. The deformation may be made to the whole of the housing 25 or just a portion of the housing 25 of the apparatus 1. In some examplary embodiments of the disclosure the deformation may comprise a stretching, bending or twisting of the housing 25 of the apparatus 1

The user input may be detected by the one or more sensors 19 and an appropriate control signal, indicative of the detected user input, may be provided to the controller 4. The output signal which is provided to the controller 4 by the one or more sensors 19 may provide an indication of the location of the deformation within the housing 25 of the apparatus 1. For example it may indicate which part of the housing 25 has been deformed or where the largest deformation has occurred.

In some examplary embodiments of the disclosure the output signal which is provided to the controller 4 by the one or more sensors 19 may also provide an indication of the type of the deformation which has been made. For example it may provide an indication of the change of shape of the housing 25. For instance, it may indicate whether the housing 25 has been stretched or bent or twisted or a combination of different deformations or it may indicate the direction of bending or twisting of the housing 25 of the apparatus 1.

In some embodiments the output signal which is provided to the controller 4 by the one or more sensors 19 may also provide an indication of a magnitude of the deformation which has been made. For example it may indicate how far the housing 25 has been stretched or the angle through which the housing 25 has been bent or twisted or the radius of curvature of a bend or twist or any other detectable characteristic which provides an indication of the magnitude of the deformation.

At block 35 a geometric transformation is performed in response to the detected user input. The geometric transformation may comprise any transformation of the content which causes further content to be added to the display 15. The geometric transformation may comprise, for example, rescaling or rotating at least a portion of the content displayed on the display 15 at block 31.

In some embodiments of the disclosure the geometric transformation may only be performed on first content which was initially displayed on the display 15 at block 31 when the user made the user input. In some embodiments of the disclosure the geometric transformation may only be performed on a first portion of the first content so that a second portion of the first content does not undergo the geometric transformation. In other embodiments of the disclosure the geometric transformation may be performed on all of the content including content which was not initially displayed on the display 15 at block 31 when the user made the user input.

The location of the deformation of the housing 25 of the apparatus 1 may determine a location within the content for performing the geometric transformation. For example where the geometric transformation comprises rescaling of a portion of the content the location of the deformation may determine which portion of the content is rescaled. The rescaling of the content may be uniform so that all of the content which is re-scaled is displayed on the display 15 at the same scale. In other embodiments the rescaling of the content may be non-uniform so that different parts of the content are rescaled by different amounts.

Examples of rescaling a portion of the content in response to detecting a user input comprising deforming at least a portions of a housing 25 of an apparatus 1 are described below in relations to FIGS. 4A to 4B and 5A to 5B.

In embodiments where the geometric transformation comprises a rotation of the content the location of the deformation may determine the location of the axis of rotation within the content. Examples of rotating the content in response to detecting a user input comprising deforming at least a portion of a housing 25 of an apparatus 1 are described below in relations to FIGS. 6A to 6C and 7A to 5D.

At block 37 the geometric transformation has been performed and the controller 4 may control the apparatus 1 so that second content is displayed on the display 15. The second content comprises at least some content which is not included in the first content and was not initially displayed on the display 15 at block 31 when the user made the user input. In some embodiments of the disclosure some of the first content may be displayed on the display 15 simultaneously with the second content. However the first content may be displayed at a different scale or orientation to which it was displayed at block 31.

The second content which is displayed on the display 15 at block 37 may be determined by the geometric transformation which has been performed. For example, where the geometric transformation comprises a rescaling, the second content added to the display 15 may depend on the amount of first content which was rescaled, the change in scale applied to the first content and the relative location within the content of the portion which has been rescaled.

The second content which is added to the display 15 may be displayed at the same scale as the first content which originally displayed at block 31. In embodiments where the geometric transformation comprises rescaling of a first portion of the first content this may cause the content to be displayed on the display 15 with a non-uniform scale. This may enable the first and second content to be displayed simultaneously but enables the second content to be displayed at a scale which is large enough to be useful to the user. The second content may also be displayed within the context of the first content. For example where the content comprises a map the position of geographical area represented by the second content relative to the geographical area represented by the first area may be indicated on the display 15.

The blocks illustrated in the FIG. 3 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

Figure 4A:
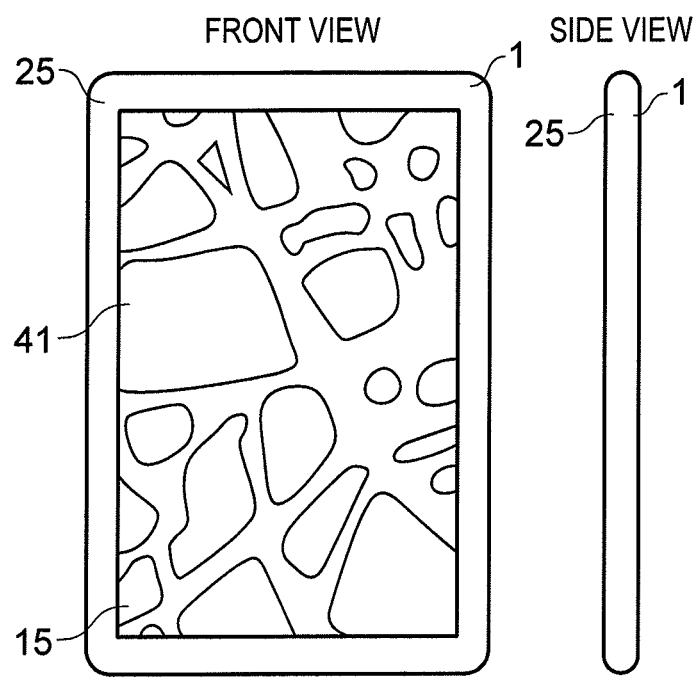
FIGS. 4A and 4B illustrate an apparatus according to a first examplary embodiment of the disclosure.
Figure 4B:
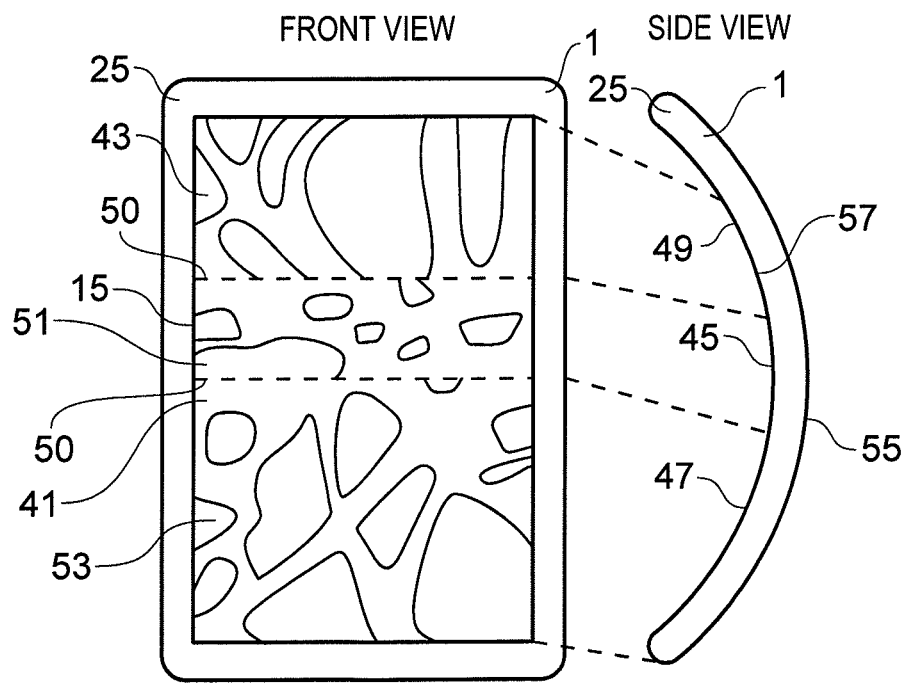

FIGS. 4A and 4B illustrate an apparatus 1 according to a first examplary embodiment of the disclosure.

FIG. 4A illustrates a front view and a side view of an apparatus 1 according to an examplary embodiment before a user input comprising deforming at least a portion of the housing 25 of the apparatus 1 has been made. FIG. 4B illustrates a front view and a side view of the same apparatus 1 after a user input comprising deforming at least a portion of the housing 25 of the apparatus 1 has been made. The apparatus 1 may be an apparatus 1 as described above in relation to FIG. 1.

The examplary apparatus 1 illustrated in FIGS. 4A and 4B comprises a housing 25 and a display 15 located in the outer surface of the housing 25. The other components of the apparatus 1, described above in relation to FIG. 1, may be located within the apparatus 1 and so are not illustrated in FIGS. 4A and 4B. The display 15 may be a flexible display which may be configured to be deformed with the rest of the housing 25 of the apparatus 1. The display 15 may be located on a front surface of the housing 25 of the apparatus 1.

In FIG. 4A the apparatus 1 is in an un-deformed state as no user input comprising deforming a portion of the housing 25 has been made. In the un-deformed state no stress or external force is being applied to the apparatus 1 by the user and so the housing 25 of the apparatus 1 is in its normal, un-deformed state. In the examplary embodiment illustrated in FIG. 4A the normal, un-deformed state comprises a substantially flat rectangular prism. In the un-deformed state the surfaces of the housing 25 if the apparatus 1 are substantially flat. It is to be appreciated that in other embodiments of the disclosure the apparatus 1 need not be flat and that other shapes of apparatus 1 could be used. For example, in other embodiments of the disclosure the housing 25 of the apparatus 1 may comprise curved or other shaped surfaces even when there is no force applied by the user of the apparatus 1.

In FIG. 4A first content 41 is displayed on the display 15. In the examplary embodiment of FIG. 4A the first content 41 comprises a map. It is to be appreciated that in other embodiments of the disclosure other types of content may be used.

In FIG. 4A the first content 41 is displayed at a uniform scale so that all of the first content 41 is displayed at the same scale or resolution.

The first content 41, illustrated in FIG. 4A comprises a portion of the content which is available to be displayed on the display 15. For example there may be portions of the map which are not displayed on the display 15 in FIG. 4A. The user of the apparatus 1 may be able to control the apparatus 1 to enable the other portions of the map to be displayed. For example a user may use a user input device 13 to scroll through the map. However, scrolling through the map causes the first content 41 to be removed from the display 15 as the new content is added to the display 15. This means that the user cannot view the first content 41 simultaneously to any other content. Alternatively a user may use a user input device 13 to reduce the scale of the map or zoom out of the map. This may cause the first content 41 to be re-scaled uniformly so that the same change in scale occurs for all of the content. This may enable a larger portion of the map to be displayed on the display 15 simultaneously. However, the reduction in scale of the map may make it difficult for the user to view the detail of the map.

FIG. 4B illustrates the same apparatus 1 of FIG. 4A after the user has made a user input comprising deforming at least a portion of the housing 25 of the apparatus 1. The apparatus 1 in FIG. 4B is configured in a deformed state. In the deformed state the user has bent the apparatus 1 by applying a force to the housing 25 which has deformed the apparatus 1 so that the housing 25 is now bent or curved.

The housing 25 of the apparatus 1 illustrated in FIG. 4B now comprises a convex surface 55 and a concave surface 57. In the embodiment of FIG. 4B the display 15 may be mounted on the concave surface 57. It is to be appreciated that in other embodiments of the disclosure the display 15 may be mounted on the convex surface 55 depending on the user input made by the user and the direction in which the apparatus 1 has been bent.

The amount of bending or curvature of the housing 25 may be proportional to the external force or stress applied by the user. By varying the stress applied to the ends of the housing 25 the user can vary the amount of bending or curvature of the housing 25.

The user may be able to control which portion of the housing 25 is bent by varying where the forces are applied within the housing 25.

The side edge view in FIG. 4B illustrates that in the deformed state the housing comprises a curved portion 45, a first substantially flat portion 47 and a second substantially flat portion 49. The first substantially flat portion 47 comprises the lower end of the apparatus 1 and the second substantially flat portion 49 comprises the upper end of the apparatus 1.

The substantially flat portions 47, 49 have not been deformed by the user input. The stresses and/or strains within the substantially flat portions 47, 49 may be much lower that the stresses and/or strains within the curved portion 45. The one or more sensors 19 may be configured to detect the respective locations of the substantially flat portions 47, 49 and the curved portion 45 and provide an output signal to the controller indicative of the locations of the respective flat and curved portion 45, 47, 49.

The content which is displayed on the display in FIG. 4B comprises the first content 41 which was previously displayed in FIG. 4A before the user input was made as well as second content 43. The second content 43 was not previously displayed on the display 15 when the user input which deformed the apparatus 1 was made.

The first content 41 illustrated in FIG. 4B comprises a first portion 51 and a second portion 53. The first portion 51 comprises content which has had a geometric transformation performed on it. In the examplary embodiments of FIG. 4B the geometric transformation comprises reducing the scale of the first portion 51 of first content 41. After the geometric transformation has been performed the first portion 51 of first content 41 is displayed at a smaller scale than in FIG. 4A.

The second portion 53 of the first content 41 comprises content which has not had a geometric transformation performed on it. Therefore, after the geometric transformation has been performed the second portion 53 of the first content 41 is displayed at the same scale as in FIG. 4A. The two portions 51, 53 of first content 41 are now displayed at different scales.

As the first portion 51 of first content 41 is displayed at a smaller scale there are now areas on the display 15 available to display the second content 43. In FIG. 4B the second content 43 is displayed in a region of the display 15 in which the first portion 51 of first content 41 was displayed in FIG. 4A, before the scale of the first portion 51 was reduced. In the examplary embodiment of FIGS. 4A and 4B the second content 43 is displayed at the same scale as the first content 41 was previously displayed before the user input was made. In FIG. 4B the second content 43 is displayed at the same scale as the second portion 53 of the first content 41. The respective different portions of the content are displayed at different scales so there is non-uniform scaling of the content.

The second content 43 comprises content which follows sequentially from the first content 41. For example, in FIG. 4B the second content 43 comprises sections of the map which would be adjacent to the first portion 51 of the first content 41 if the whole of the map were displayed.

In the examplary embodiment of FIG. 4B a boundary 50 is displayed on the display 15. The boundary 50 indicates the edges of the first portion 51 of the first content 41. The boundary 50 may provide an indication to the user of the apparatus 1 which portions of the content displayed on the display 15 have been rescaled and may enable the user to distinguish between the different portions of content.

In the examplary embodiment of FIGS. 4A and 4B the location of the curved portion 45 within the housing 25 determines a location within the content for performing a geometric transformation in that it determines which portion of the content is to be rescaled. The controller may be configured to determine the location of the curved portion 45, the first substantially flat portion 47 and the second substantially flat portion 49. The controller then controls the apparatus so that content displayed in the area of the display 15 in the first substantially flat portion 47 does not have a geometric transformation performed on it. This content comprises the second portion 53 of the first content 41 and is displayed at the same scale both before and after the user input is detected. The controller 4 then controls the apparatus 1 so that first content displayed in the area of the display 15 above the first substantially flat portion 47 is rescaled so that it reduced to fit into the area of the display 15 located in the curved portion 45. This leaves the area of the display 15 located in the second substantially flat portion 49 vacant and so the controller obtains second content 43 and controls the apparatus 1 to display this in the area of the display 15 located in the second substantially flat portion 49.

In the embodiment illustrated in FIGS. 4A and 4B the scaling is uniform so that all of the content which is re-scaled is displayed on the display 15 at the same scale. It is to be appreciated that in other embodiments the resealing of the content may be non-uniform so that different parts of the content are rescaled by different amounts. For example, in some embodiments the rescaling factor may be a maximum at the centre of the deformed portion and the rescaling factor may gradually be decreased to zero at the boundary of the deformed portion. In such embodiments the boundary 50 might not be displayed.

It is to be appreciated that in other embodiments of the disclosure the user may be able to control the apparatus 1 to rescale different portions of the content by bending different portions of the housing 25.

In some embodiments of the disclosure the apparatus 1 may be configured to detect a further user input which may cause a further geometric transformation to be performed. The further geometric transformation may cause the second content 43 to be removed from the display 15. The further geometric transformation may comprise the reversal of the geometric transformation which is performed in response to the first user input. For example, in the embodiment of FIGS. 4A and 4B the further geometric transformation may comprise increasing the scale of the first portion 51 of the first content 41. This may cause the first portion 51 of the first content 41 to be displayed at the same scale as the second portion 53 of the first content 41.

In some embodiments the further user input may comprise deforming the same portion of the housing 25 of the apparatus 1 as is deformed in the first user input. The further user input may comprise deforming the housing 25 of the apparatus 1 in a direction substantially opposite to the deforming of the initial user input. For example, in the embodiment of FIGS. 4A and 4B the further user input may comprise bending the housing 25 of the apparatus 1 so as to return the curved apparatus 1 as illustrated in FIG. 4B back to the substantially flat non-deformed state as illustrated in FIG. 4A.

Figure 5A:
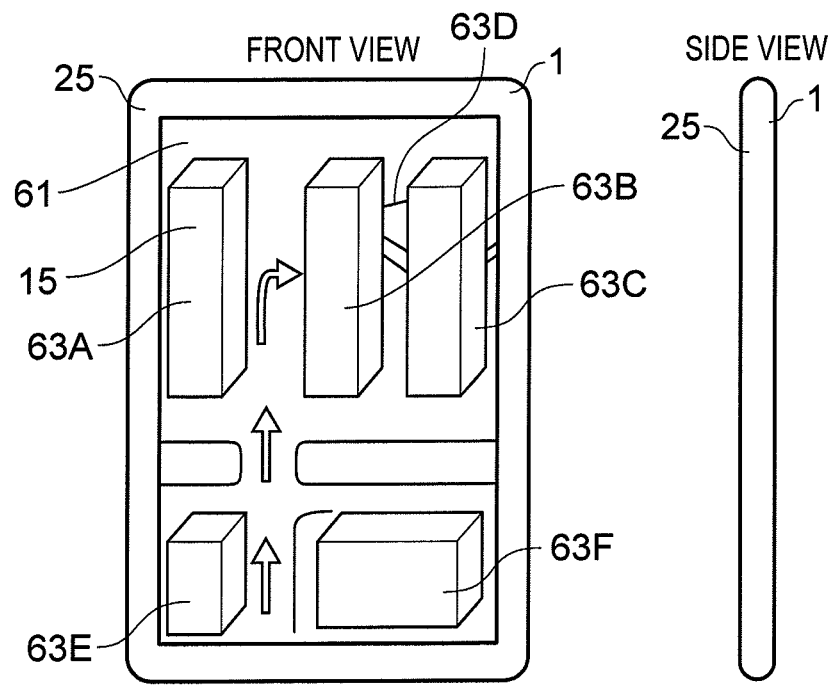
FIGS. 5A and 5B illustrate an apparatus according to a second examplary embodiment of the disclosure.
Figure 5B:
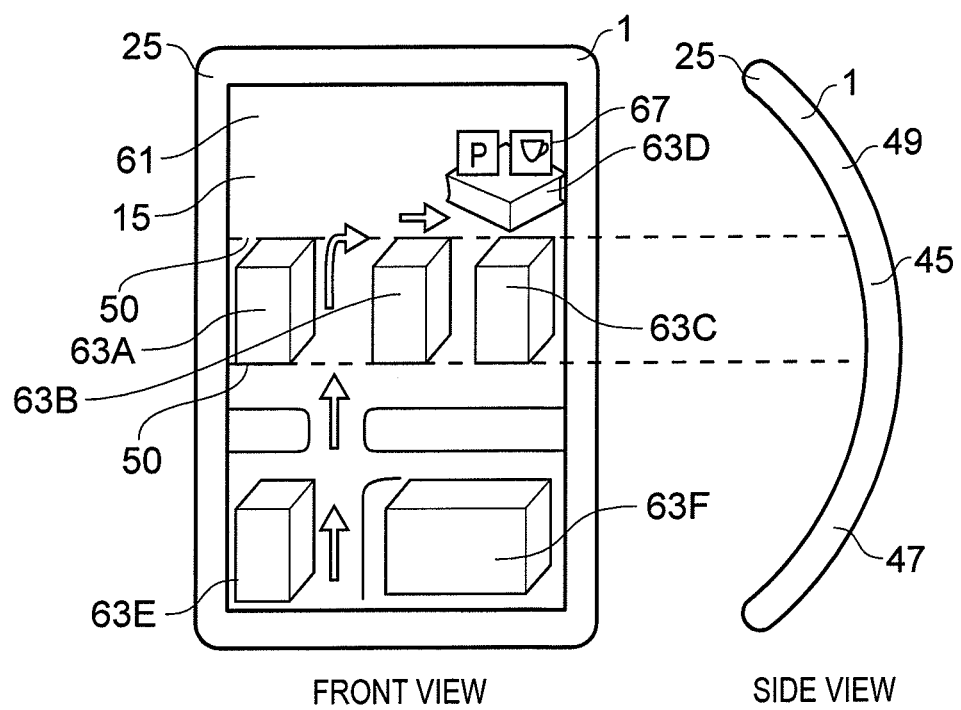

FIGS. 5A and 5B illustrate an apparatus 1 according to a second examplary embodiment of the disclosure.

FIG. 5A illustrates a front view and a side view of an apparatus 1 according to another examplary embodiment before a user input comprising deforming at least a portion of the housing 25 of the apparatus 1 has been made. FIG. 5B illustrates a front view and a side view of the same apparatus 1 after a user input comprising deforming at least a portion of the housing 25 of the apparatus 1 has been made. The apparatus 1 may be an apparatus 1 as described above in relation to FIGS. 1 and 4A to 4B.

As with the examplary apparatus 1 illustrated in FIGS. 4A and 4B, the apparatus of FIGS. 5A and 5B comprises a housing 25 and a display 15 located in the outer surface of the housing 25.

In FIG. 5A the apparatus 1 is in an un-deformed state as no user input comprising deforming a portion of the housing 25 has been made. The un-deformed state of the apparatus 1 is described above in relation to FIG. 4A.

In FIG. 5A first content 61 is displayed on the display 15. In the examplary embodiment of FIG. 5A the first content 61 comprises a map which comprises graphical representations 63A to F of three dimensional objects within the map. The graphical representations 63A to F may be representations of real world three dimensional objects which may be located in the geographical area represented by the map. The graphical representations 63 may provide the perception of the three dimensions of the object so that a user viewing the graphical representation would recognize that the object has three dimensions. In the examplary embodiment of FIGS. 5A and 5B the dimensions may comprise depth, width and height. The three dimensions may correspond to an x, y and z axis in a Cartesian coordinate system where each axis is perpendicular to the other two axis.

In the examplary embodiment of FIG. 5A the graphical representations 63A to F of some of the three dimensional objects obscure the graphical representations 63A to F of other objects. For example, in FIG. 5A the map comprises graphical representations 63A, 63B and 63C which may represent tall buildings or other large structures. These graphical representations 63A, 63B and 63C obscure the graphical representation 63D of the objects which are located behind them. This prevents the graphical representation 63D of the objects behind the tall buildings from being displayed on the display and so restricts the content which is provided to the user of the apparatus 1.

FIG. 5B illustrates the same apparatus 1 of FIG. 5A after the user has made a user input comprising deforming at least a portion of the housing 25 of the apparatus 1. The user input in the example illustrated in FIG. 5B comprises bending the housing 25 of the apparatus 1 so that the housing 25 comprises a curved portion 45, a first substantially flat portion 47 and a second substantially flat portion 49 as described above in relation to FIG. 4B.

In response to the detecting the bending of the apparatus 1 the controller 4 performs a geometric transformation. In the example of FIGS. 5A and 5B the geometric transformation comprises rescaling at least some of the graphical representations 63 of the three dimensional objects. The rescaling of the graphical representations 63 of the three dimensional objects may comprise changing one or more of the perceived dimensions of the graphical representations 63.

In the example of FIG. 5B the geometrical transformation comprises rescaling the graphical representations 63A, 63B and 63C of the tall buildings by reducing the height of the graphical representations 63A, 63B and 63C. This reduces the area of the display 15 occupied by the graphical representations 63A, 63B and 63C and enables second content 67, which was not previously displayed on the display 15 to be added to the display 15. In the example of FIG. 5B the second content 67 comprises a graphical representation 63D of a building which is located behind the tall buildings.

In the examplary embodiment of FIG. 5B a boundary 50 is displayed on the display 15. The boundary 50 indicates the edges of the curved portion 45 of the apparatus 1. The boundary 50 may provide an indication to the user of the apparatus 1 which graphical representations 63 have been rescaled.

In the examplary embodiment of FIGS. 5A and 5B the location of the curved portion 45 within the housing 25 determines a location within the content for performing a geometric transformation in that it determines which of the graphical representations 63A to F are to be rescaled. In the examplary embodiment of FIGS. 5A and 5B only the graphical representations 63 which are displayed in the portion of the display 15 located in the curved portion 45 are rescaled. All of the other graphical representations 63 are not rescaled and so are displayed at the same scale both before and after the user input has been detected. This may cause a plurality of different graphical representations 63 to be displayed at different scales after the user input has been detected.

In the examplary embodiment of FIGS. 5A and 5B the rescaling is only applied to the graphical representations 63 of the three dimensional objects within the curved portion 45. For example only items which have a height above a pre-determined threshold might be re-scaled. In some embodiments of the disclosure the predetermined threshold height may be zero. Other items, which may be displayed the in portion might not be changed. For example, the roads displayed in the curved portion 45 may be displayed at the same scale both before and after the user input is detected.

It is to be appreciated that in other embodiments of the disclosure the user may be able to control the apparatus 1 to rescale different graphical representations 63 by bending different portions of the housing 25.

Figure 6A:
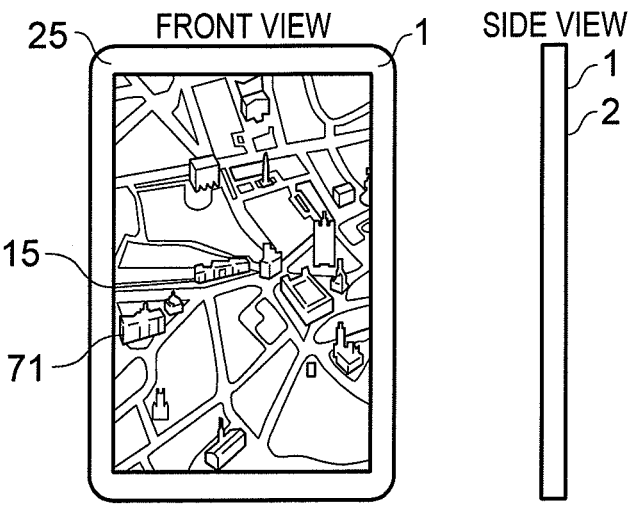
FIGS. 6A to 6C illustrate an apparatus according to a third examplary embodiment of the disclosure.
Figure 6B:
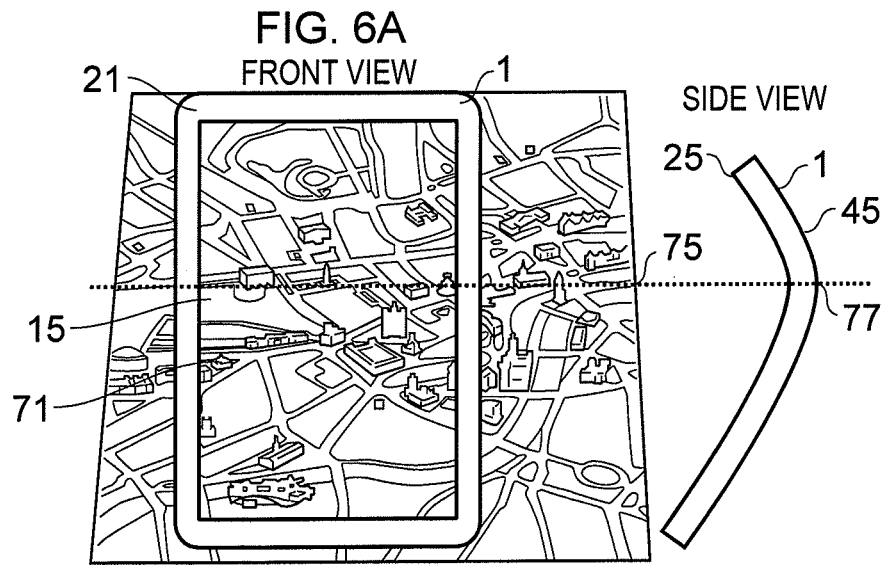
Figure 6C:
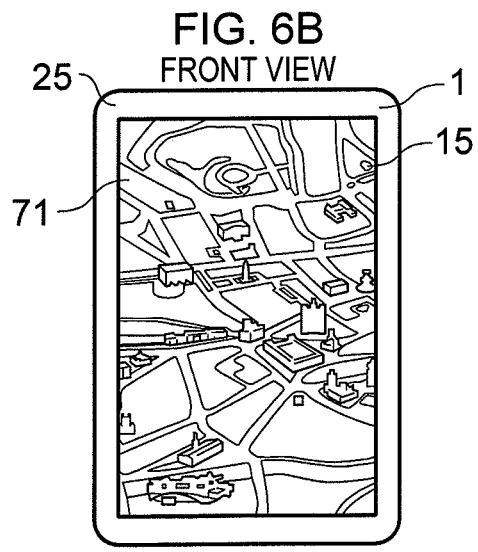

FIGS. 6A to 6C illustrate an apparatus 1 according to a third examplary embodiment of the disclosure.

FIG. 6A illustrates a front view and a side view of an apparatus 1 according to another examplary embodiment before a user input comprising deforming at least a portion of the housing 25 of the apparatus 1 has been made. FIGS. 6B and 6C illustrate a front view and a side view of the same apparatus 1 after a user input comprising deforming at least a portion of the housing 25 of the apparatus 1 has been made. The apparatus 1 may be an apparatus 1 as described above in relation to FIGS. 1, 4A to 4B and 5A to 5B.

As with the examplary apparatus 1 illustrated in FIGS. 4A to 4B and 5A to 5B, the apparatus of FIGS. 6A to 6C comprises a housing 25 and a display 15 located in the outer surface of the housing 25.

In FIG. 6A the apparatus 1 is in an un-deformed state as no user input comprising deforming a portion of the housing 25 has been made. The un-deformed state of the apparatus 1 is described above in relation to FIG. 4A.

In FIG. 6A first content 71 is displayed on the display 15. In the examplary embodiment of FIG. 6A the first content 71 comprises a map. In FIG. 6A the map is displayed as though it is being viewed from a first orientation. In particular example of FIG. 6A the map is displayed as though it is two dimensional map which is oriented in a plane which is parallel to the plane of the surface of the display 15.

In FIG. 6B the user has made a user input comprising bending at least a portion of the housing of the apparatus 1 as described above in relation to FIGS. 4A to 4B and 5A to 5B.

In response to the detecting the bending of the apparatus 1 the controller 4 performs a geometric transformation which enables second content to be added to the display 15. In the example of FIGS. 6A to 6C the geometric transformation comprises rotating the content.

In the examplary embodiment of FIGS. 6A to 6C the location of the deforming within the housing 25 determines a location within the content for performing a geometric transformation in that it determines the axis of rotation 75 of the content. In the examplary embodiment of FIG. 6B the axis of rotation 75 of the content is determined by the apex 77 of the curved portion 45 of the apparatus 1.

In the example of FIG. 6B the axis of rotation 75 comprises an axis which extends substantially horizontally through the all of the content including content which is not currently displayed on the display 15. The position of the axis within the content corresponds to the content which is displayed in the line extending substantially horizontally across the surface of the display 15 in the location of the display 15 corresponding to the apex 77 of the curved portion 45.

The content may be rotated about the axis of rotation 75 so that it is no longer displayed as though it is oriented in a plane which is parallel to the plane of the surface of the display 15. The content is displayed as though it is orientated at an angle to the plane of the surface of the display 15. In some examplary embodiments the angle may be greater than 0 degrees but not greater than 90 degrees.

The angle and direction of the rotation may be determined by the user input which is made. For example the magnitude of the angle of rotation may be determined by the magnitude of the bending of the apparatus 1. The direction of the rotation may be determined by the direction of the bending of the apparatus 1. For example, the apparatus 1 may be bent so that the display 15 is provided on a concave surface of the apparatus 1 as illustrated in FIG. 6B or so that the display 15 is provided on a convex surface of the apparatus 1. This may enable the user to control the apparatus 1 to rotate the content in different directions.

FIG. 6C illustrates a front view of the apparatus 1 after the content has been rotated. As the content is now displayed as though it is orientated in a plane which is not parallel to the plane of the surface of the display 15 this causes a different perspective of the content to be provided. This enables some of the first content 71 which was previously displayed on the display 15 to the be displayed as well as some further content 79 which was not previously displayed on the display 15.

FIGS. 7A to 7E illustrate an apparatus 1 according to a fourth examplary embodiment of the disclosure.

FIGS. 7A to 7E illustrate front and side views of an apparatus 1 which may be the same as the apparatus 1 described above in relation to FIGS. 1, 4A to 4B, 5A to 5B and 6A to 6C.

Figure 7A:
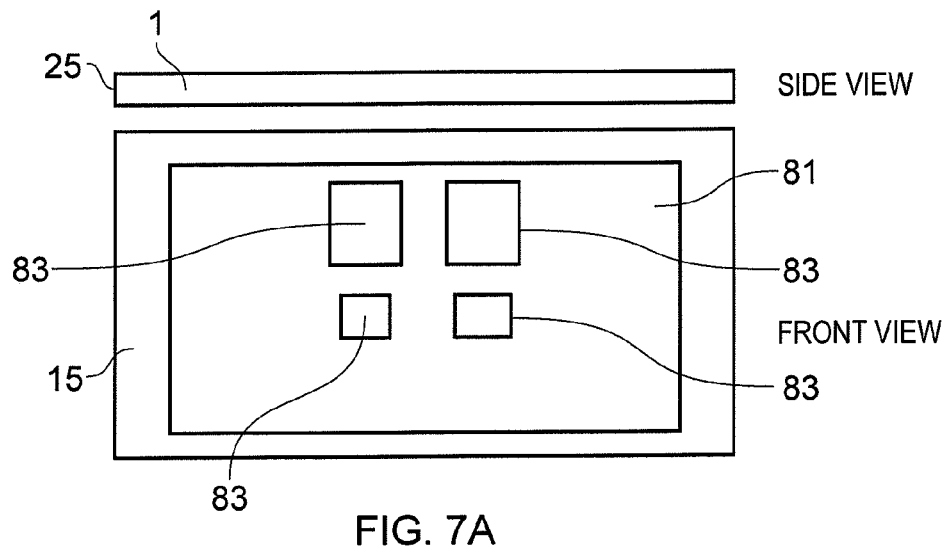
FIGS. 7A to 7E illustrate an apparatus according to a fourth examplary embodiment of the disclosure.

In FIG. 7A the apparatus 1 is in an un-deformed state as no user input comprising deforming a portion of the housing 25 has been made. The un-deformed state of the apparatus 1 is described above in relation to FIG. 4A.

In FIG. 7A first content 81 is displayed on the display 15. In the examplary embodiment of FIG. 7A the first content 81 comprises graphical representations 83 of a plurality of objects. In FIG. 7A the graphical representations 83 of a plurality of objects are displayed as though they are being viewed from directly above the objects. For example in some embodiments of the disclosure the first content 81 may comprise a photograph such as a satellite photograph. In such an embodiment the graphical representations 83 of the plurality of objects may comprise representations or photographs of objects as though they are viewed from above. Such representations may provide limited information to the user of the apparatus 1 as they only enable the user to view one side of graphical representation 83 of the object. Therefore the first content 81 of FIG. 7A only comprises representations of one side of the objects.

Figure 7B:
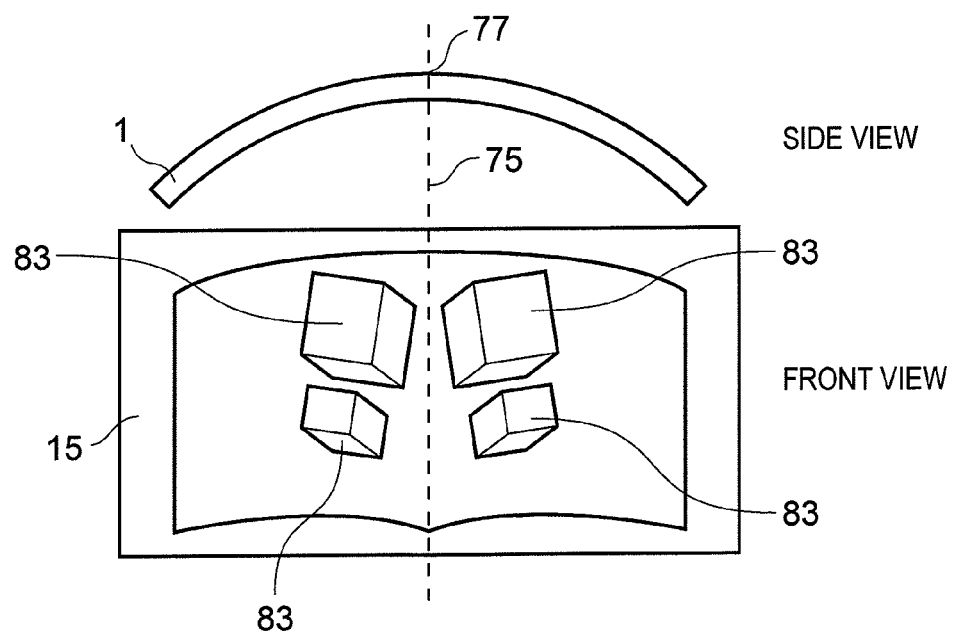

In FIG. 7B the user has made a user input comprising bending at least a portion of the housing of the apparatus 1 as described above in relation to FIGS. 4A to 4B, 5A to 5B and 6A to 6C.

In response to the detecting the bending of the apparatus 1 the controller 4 performs a geometric transformation. In the example of FIGS. 7A to 7E the geometric transformation comprises rotating the content.

In the examplary embodiment of FIGS. 7A to 7E the location of the deforming within the housing 25 determines a location within the content for performing a geometric transformation in that it determines the axis of rotation 75 of the content. In the examplary embodiment of FIG. 7B the axis of rotation 75 of the content corresponds to the apex 77 of the curved portion 45 of the apparatus 1 as described above in relation to FIG. 6B.

In FIG. 7B the content displayed on the display 15 is rotated about the axis of rotation 75 so that the graphical representations 83 of the objects are displayed as though they are viewed from above but from an angle different to the angle from which they were viewed in FIG. 7A. Therefore, in FIG. 7B the second content which is added to the display 15 comprises a representation of some of the sides of the objects which was not previously displayed.

Figure 7C:
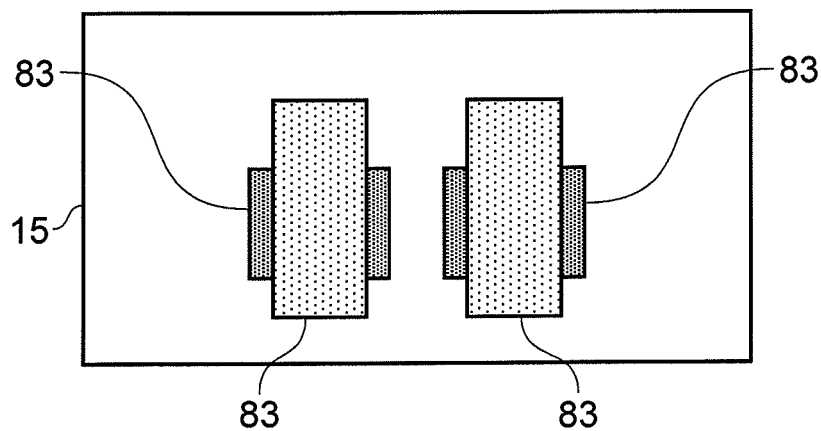
Figure 7D:
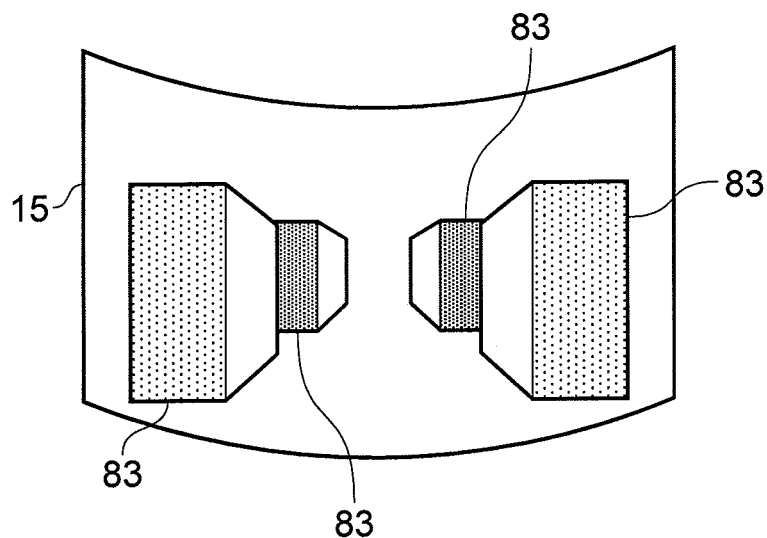

FIGS. 7C and 7D illustrate a similar example to FIGS. 7A and 7B. In However in FIG. 7C the objects are displayed from a side view rather than a satellite view. In the original side view in FIG. 7C, where the apparatus 1 is configured in a substantially flat state, the objects are viewed from an orientation such that the graphical representation 83 only comprise one side of the objects. In FIG. 7D, after the geometric transformation has been performed and the image has been rotated about the axis of rotation 75 second content comprising representations of other sides of the objects has been added to the display 15.

Figure 7E:
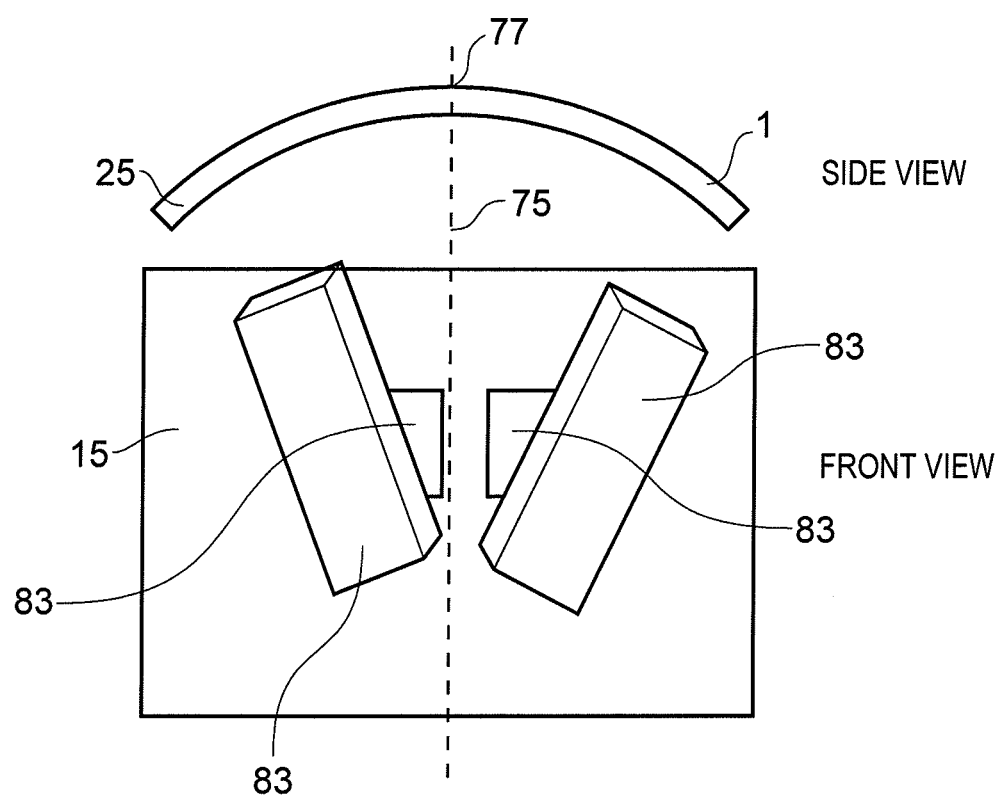

FIG. 7E illustrates a further examplary embodiment similar to the examples of FIGS. 7A to 7D. In the example of FIG. 7E the graphical representations 83 in the foreground of the image are rotated more than the graphical representations 83 in the background of the image. This causes new content to be added to the display 15 as it enables content which was originally displayed behind the front graphical representations 83 to be added to the display 15. In some embodiments of the disclosure the front graphical representations 83 may also be twisted or have their shape changed so that other content may also be displayed.

In the example of FIGS. 7A to 7E the angle and direction of the rotation may be determined by the user input which is made as in the example of FIGS. 6A to 6C. For example the magnitude of the angle of rotation may be determined by the magnitude of the bending of the apparatus 1 and the direction of the rotation may be determined by the direction of the bending of the apparatus 1.

Embodiments of the invention provide the advantage that they enable a user to control content displayed on a display 15 using a user input comprising deforming a portion of the housing 25 of the apparatus 1. Such inputs are simple and intuitive for a user to make. Also the various inputs which may be made may enable different types of geometric transformations to be performed and so a simple user input may be used to provide a wide range of different outputs. This may enable embodiments of the disclosure to be used in a variety of different apparatus and modes of operation of the respective apparatus.

Embodiments of the disclosure also enable a user to control an apparatus to add content to the display which was not displayed on the display before the user input was made. By non-uniformly scaling the content this enables the second content to be displayed simultaneously to the first content. This enables a user to view the second content in context of the original first content.

Alternatively the rotation of the content may enable new content to be added to the display as it enables objects to be viewed from a different perspective. For example, this may enable a user to view two different sides of a building. This may be particularly beneficial if one of the sides of the building does not contain much useful information, for example, a satellite view of a building might only show a roof which might not provide enough information to the user to enable the apparatus to determine what the building is.

Although embodiments of the present invention have been described in the preceding paragraphs with reference to various examples, it should be appreciated that modifications to the examples given can be made without departing from the scope of the invention as claimed. For example in some embodiments of the disclosure the geometric transformation that is performed in response to the user input may depend on the deformation which is made to the housing 25 of the apparatus 1. For example, in the above described embodiments, bending the apparatus 1 so that the display 15 is mounted on the concave surface 57 causes the scale of content to be reduced. It is to be appreciated that in other embodiments of the disclosure bending the apparatus 1 so that the display 15 is mounted on the convex surface 55 of the apparatus 1 may cause the scale of the content to be increased.

Also in the above described embodiments the housing 25 of the apparatus 1 is substantially flat and the user input may comprise deforming the housing 25 of the apparatus 1 into a curved state. In other embodiments of the disclosure the housing 25 of the apparatus 1 may comprise curved or other shaped surfaces even when there is no force applied by the user of the apparatus 1 so that the user input may comprise deforming the housing 25 of the apparatus 1 into a substantially flat state.

It is to be appreciated that in embodiments of the invention the user may be able to scroll through the content displayed on the display 15. If the apparatus is in a deformed state this may change the content which is displayed in the deformed portion of the display 15. This may cause the rescaling or other geometric transformation to be applied to different content so that that the transformed or rescaled content is always displayed in the deformed portion of the display 15.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    displaying, a first geographical area of a map but not a second geographical area of the map on a display of an apparatus, wherein the first geographical area of the map and the second geographical area of the map represent adjacent and non-overlapping geographical areas;
    at the apparatus, detecting a user input wherein the user input comprises deforming at least a portion of a housing of the apparatus; and
    in response to detecting the user input, performing a geometric transformation on the map such that after the geometric transformation the second geographical area of the map, different than the first geographical area of the map, is displayed on the display;
    wherein the location of the deforming within the housing of the apparatus determines a location within the map for performing the geometric transformation, and wherein deformation at a first location causes a first geometric transformation at a first location in the map and deformation at a second location causes a second geometric transformation at a second location in the map, wherein the first and second geometric transformations are the same type of said geometric transformation, and
    wherein the geometric transformation comprises changing a scale of a first portion of the first geographical area of the map such that after the geometric transformation has been performed the first portion of the first geographical area of the map is displayed at a first scale and a second portion of the first geographical area of the map is displayed at a second scale where the second scale is different to the first scale.

2. A method as claimed in claim 1 wherein the change in scale of the first portion of the first geographical area of the map comprises reducing the scale of the first portion of the first geographical area of the map so that the second geographical area of the map can be displayed on the display.

3. A method as claimed in claim 1 wherein the second geographical area of the map is displayed at the second scale.

4. A method as claimed in claim 1 wherein the location of the deforming within the housing of the apparatus determines the location of the first portion of the first geographical area of the map within the map.

5. A method as claimed in claim 4 wherein the first portion of the first geographical area of the map comprises content which is displayed in an area of the display which is deformed when the user input is made.

6. A method as claimed in claim 1 further comprising detecting a further user input and in response to detecting the further user input performing a further geometric transformation so that the second geographical area of the map is removed from the display.

7. A method as claimed in claim 6 wherein the further user input comprises deforming the same portion of the housing of the apparatus.

8. A method as claimed in claim 6 wherein the deforming of the further user input is performed in a direction substantially opposite to the deforming of the user input.

9. A method as claimed in claim 1 wherein the deforming comprises bending at least a portion of the housing of the apparatus.

10. A method as claimed in claim 1 wherein the map comprises at least one graphical representation of a three dimensional object wherein the graphical representations provide the perception of the three dimensions of the object.

11. A method as claimed in claim 1 wherein the geometrical transformation comprises changing the scale of at least one of the perceived dimensions of the at least one graphical representation of a three dimensional object.

12. A method as claimed in claim 1 wherein the geometric transformation performed on the first geographical area of the map comprises shrinking of at least a portion of the first geographical area.

13. A method as claimed in claim 1 wherein the second geographical area of the map is displayed at the same scale as the first geographical area of the map was displayed prior to the geometric transformation.

14. An apparatus comprising:
   at least one processor; and
   at least one memory including computer program code;
   wherein the at least one memory and the computer program code are configured to, with the at least one processor, enable the apparatus to:
   display, a first geographical area of a map on a display but not a second geographical area of the map on the display, wherein the first geographical area of the map and the second geographical area of the map represent adjacent and non-overlapping geographical areas;
   detect a user input wherein the user input comprises deforming at least a portion of a housing of the apparatus; and
   in response to detecting the user input, perform a geometric transformation on the map such that after the geometric transformation the second geographical area of the map, different than the first geographical area of the map, is displayed on the display;
   wherein the location of the deforming within the housing of the apparatus determines a location within the map for performing the geometric transformation, and wherein deformation at a first location causes a first geometric transformation at a first location in the map and deformation at a second location causes a second geometric transformation at a second location in the map, wherein the first and second geometric transformations are the same type of said geometric transformation, and
   wherein the geometric transformation comprises changing a scale of a first portion of the first geographical area of the map such that after the geometric transformation has been performed the first portion of the first geographical area of the map is displayed at a first scale and a second portion of the first geographical area of the map is displayed at a second scale where the second scale is different to the first scale.

15. An apparatus as claimed in claim 14 wherein the change in scale of the first portion of the first geographical area of the map comprises reducing the scale of the first portion of the first geographical area of the map so that the second geographical area of the map can be displayed on the display.

16. An apparatus as claimed in claim 14 wherein the second geographical area of the map is displayed at the second scale.

17. A non-transitory physical entity embodying a computer program comprising computer program instructions that, when executed by at least one processor, cause an apparatus at least to perform:
   displaying, a first geographical area of a map on a display but not a second geographical area of the map on the display, wherein the first geographical area of the map and the second geographical area of the map represent adjacent and non-overlapping geographical areas;
   detecting a user input wherein the user input comprises deforming at least a portion of a housing of the apparatus; and
   in response to detecting the user input, performing a geometric transformation on the map such that after the geometric transformation the second geographical area of the map, different than the first geographical area of the map, is displayed on the display;
   wherein the location of the deforming within the housing of the apparatus determines a location within the map for performing the geometric transformation, and wherein deformation at a first location causes a first geometric transformation at a first location in the map and deformation at a second location causes a second geometric transformation at a second location in the map, wherein the first and second geometric transformations are the same type of said geometric transformation, and
   wherein the geometric transformation comprises changing a scale of a first portion of the first geographical area of the map such that after the geometric transformation has been performed the first portion of the first geographical area of the map is displayed at a first scale and a second portion of the first geographical area of the map is displayed at a second scale where the second scale is different to the first scale.

* * * * *